UNITED STATES PATENT OFFICE.

ALLERTON S. CUSHMAN, OF WASHINGTON, DISTRICT OF COLUMBIA.

ANTISEPTIC-SOLUTION.

1,399,007.  Specification of Letters Patent.  Patented Dec. 6, 1921.

No Drawing.  Application filed June 13, 1917. Serial No. 174,573.

*To all whom it may concern:*

Be it known that I, ALLERTON S. CUSHMAN, a citizen of the United States, residing at Washington, in the District of Columbia, have invented certain new and useful Improvements in Antiseptic Solutions, of which the following is a specification.

This invention relates to a novel composition of matter produced by reacting with sulfur dioxid ($SO_2$) in sufficient proportions upon an aqueous solution of formaldehyde. ($CH_2O$).

My preferred method of preparing the composition is as follows:

A stream of sulfur dioxid gas is passed into or otherwise absorbed in commercial formaldehyde solution, the latter being preferably of about forty per cent. concentration. Absorption is extremely rapid and sufficiently complete, and a product is formed which is believed to correspond to the chemical formula, $CH_2(OH)SO_3H$, which may be designated formaldehyde-sulfurous acid. The reaction proceeds at ordinary temperatures, and overheating may be prevented by the application of suitable cooling means. The reaction may be assumed to proceed in accordance with the equation—

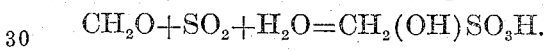
$$CH_2O + SO_2 + H_2O = CH_2(OH)SO_3H.$$

According to this equation, 100 parts by weight of forty per cent. formaldehyde should unite with about 85 parts by weight of sulfur dioxid. This result I approximately attain. As the reaction continues to saturation the liquid becomes progressively thicker and heavier, and may ultimately acquire a consistence somewhat resembling that of strong sulfuric acid (oil of vitriol). On final saturation, the specific gravity of the solution is about 1.40.

This concentrated solution is readily transportable and can be diluted with water to any desired extent preparatory to use. When the solution, either strong or diluted, is permitted to evaporate into the air, it undergoes spontaneous decomposition into its original components, sulfur dioxid and formaldehyde, and hence combines the known antiseptic, germicidal and insecticidal properties of these substances. My new product is therefore available generally for the several purposes above indicated.

I have also found that the product, suitably diluted with water, is of particular value in connection with certain agricultural operations, including the preliminary treatment of agricultural soils, as explained below.

It is known that certain antiseptic substances, including formaldehyde, exert a beneficial effect in increasing the growth of crops (see "The Action of Antiseptics in Increasing the Growth of Crops in Soils," *Journal Society of Chemical Industry*, XXXII, 24, 1136, Russel and Buddin). These investigators proved that formaldehyde is effective in increasing the growth of seedlings, due to the fact that it destroys certain protozoa known to be occupants of agricultural soils and destructive of the nitrifying and other useful bacteria therein, and also possibly by reason of the tendency of formaldehyde to concentrate nitrates and ammonia in the treated soils. Formaldehyde however does not, so far as now known, accelerate the germination of seeds, and it may in fact tend to retard their germination, owing to its known action in toughening or hardening the shell-like integuments which surround the germs of plant seeds.

Solutions of formaldehyde-sulfurous acid prepared as above described have shown a distinct tendency to accelerate the growth of seedlings when applied to the soil in the form of a highly dilute solution, for example one part of the concentrated reaction product dissolved in 100 parts of water. In this respect, their action is similar to that of formaldehyde itself. On the other hand, a marked shortening of the period of germination has been noted, this effect being entirely different from that observed in the case of formaldehyde. Presumably this is due to the softening action of sulfur dioxid or its oxidation products (sulfuric acid) upon the integument of the seed.

In order to test this, certain seed boxes were prepared with ordinary potting soils in a green-house. Some of these soils were dampened with water in the usual way. In other seed boxes, the soil was dampened with a diluted solution of formaldehyde-sulfurous acid (1:100) which was then allowed to evaporate from the soil before planting. Seeds of *Cannabis indicia* were then sown in the several boxes. The seeds in soils dampened with water required between two and three weeks for germination, and when finally germinated grew at the normal rate. The seeds in soil treated with formaldehyde-sulfurous acid germinated in five days, and also exhibited a decidedly more rapid rate of growth.

It is believed that the observed beneficial effects of formaldehyde-sulfurous acid upon these soils are attributable to the following causes:—

(1) to the destruction of deleterious micro-organisms, such as protozoa, fungous spores, etc.;

(2) to the hastening of the germination of the seed, probably by the action of the oxidation products remaining in the soil; and (3) to the stimulation of the growth of the crops, due to the accumulation of soluble nitrogen compounds.

The solution may also be used to destroy the seeds of weeds in the soil as a preliminary to planting with useful crops. For this purpose the concentration will preferably be somewhat higher than above noted, corresponding for example approximately to a 0.4% solution of formaldehyde, which is known to be effective for the destruction of seed germs (*Journal Society of Chemical Industry*, 1898, page 477, Windisch).

I claim:—

A composition of matter comprising the product of reaction of sulfur dioxid upon formaldehyde in the presence of water, said product being a liquid having sufficient stability to permit transportation and a specific gravity approximating 1.4.

In testimony whereof I affix my signature in presence of two witnesses.

ALLERTON S. CUSHMAN.

Witnesses:
P. H. BUTLER,
PAUL BUDEKAMP.